Jan. 5, 1926.
F. M. HESS
1,568,157
METHOD OF AND APPARATUS FOR EFFECTING CONTINUOUS DISTILLATION
Filed Dec. 29, 1921   3 Sheets-Sheet 1
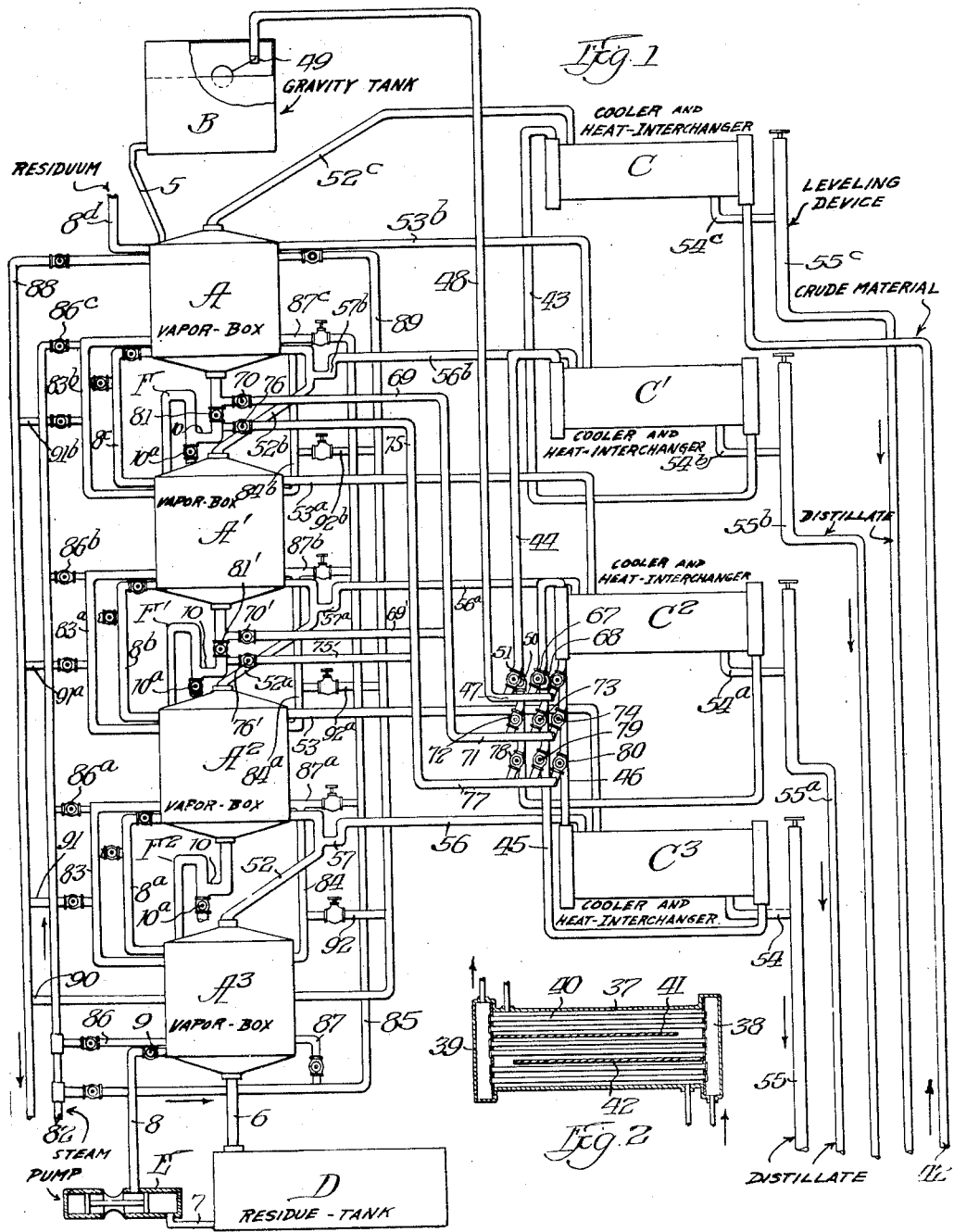

Jan. 5, 1926.
F. M. HESS
1,568,157
METHOD OF AND APPARATUS FOR EFFECTING CONTINUOUS DISTILLATION
Filed Dec. 29, 1921    3 Sheets-Sheet 2
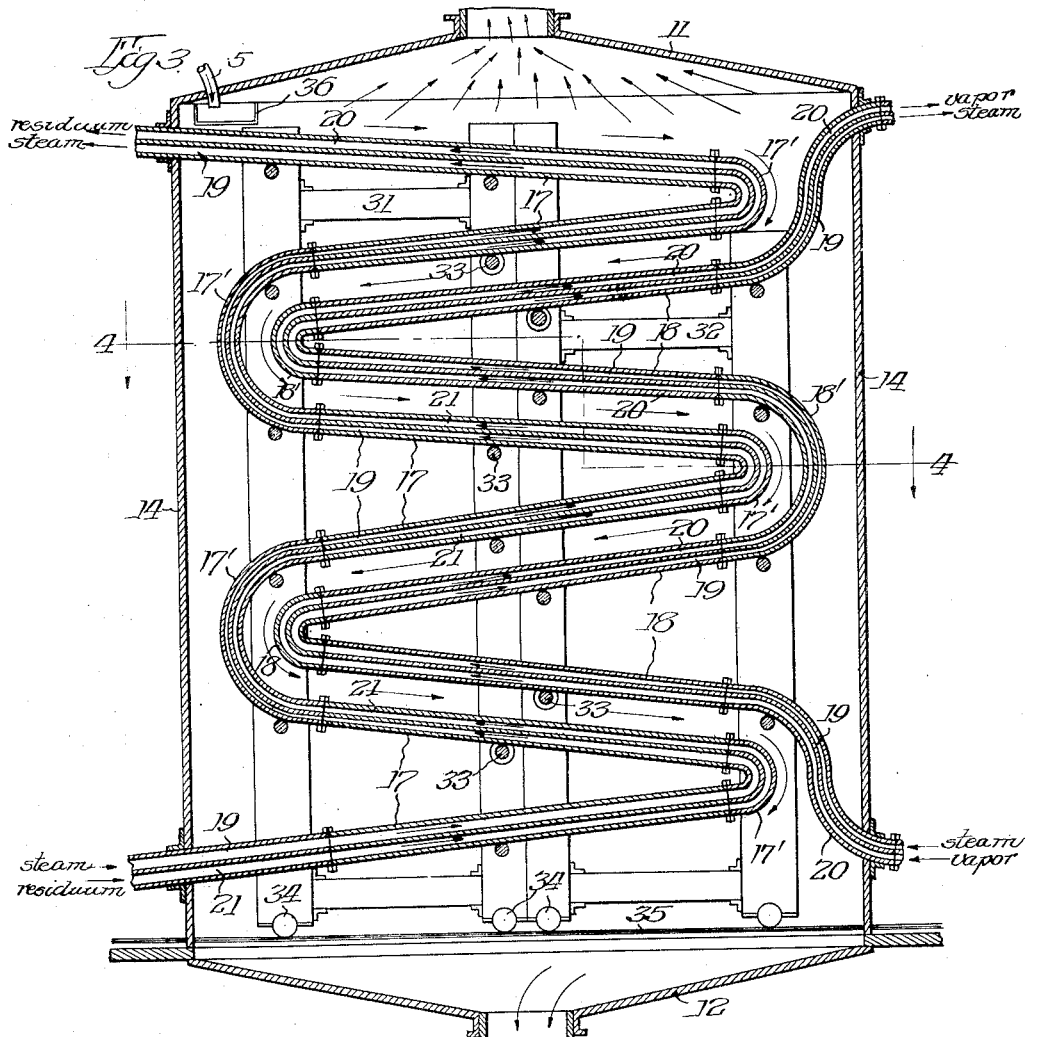
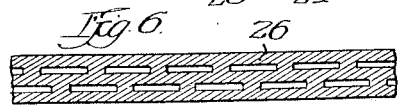
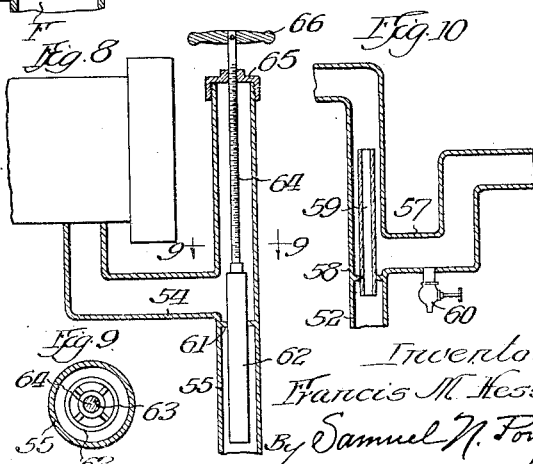

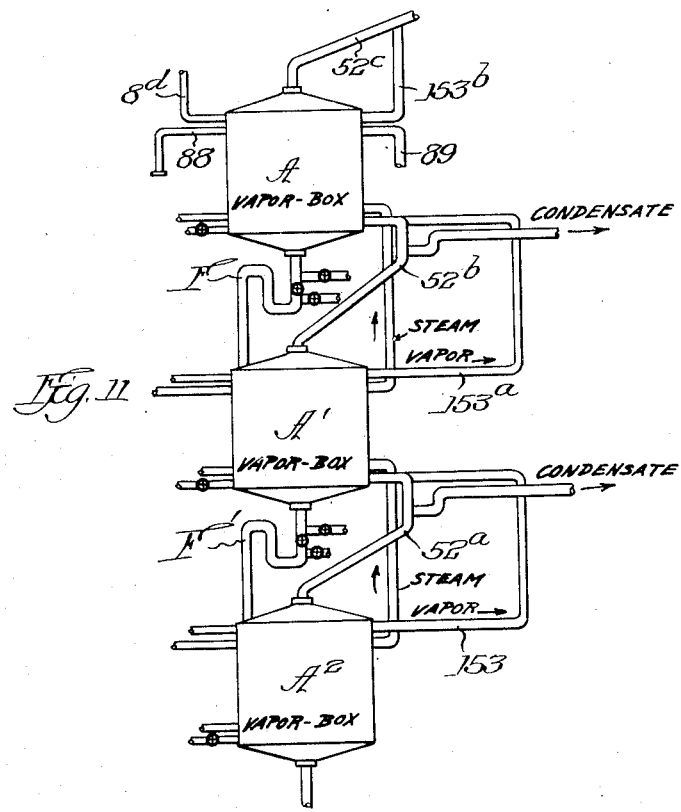
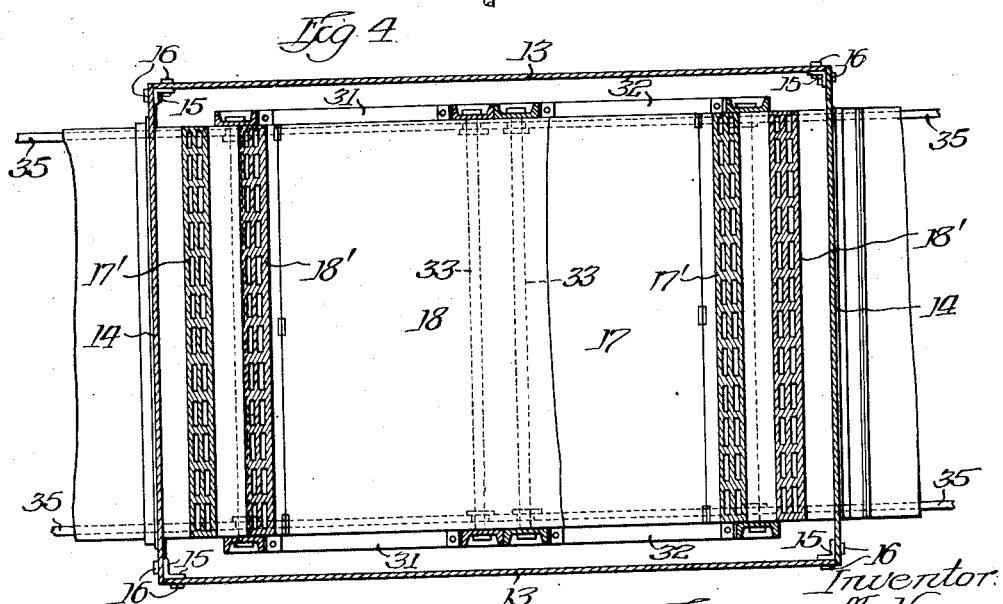

Patented Jan. 5, 1926.

1,568,157

UNITED STATES PATENT OFFICE.

FRANCIS M. HESS, OF WHITING, INDIANA.

METHOD OF AND APPARATUS FOR EFFECTING CONTINUOUS DISTILLATION.

Application filed December 29, 1921. Serial No. 525,597.

*To all whom it may concern:*

Be it known that I, FRANCIS M. HESS, a citizen of the United States, residing at Whiting, in the county of Lake and State of Indiana, have invented certain new and useful Improvements in Methods of and Apparatus for Effecting Continuous Distillation, of which the following is a specification.

This invention relates to a new and improved method of, and apparatus for, effecting the continuous distillation of hydrocarbon materials, such as coal tar and petroleum, and their distillates; and the present invention is in the nature of an improvement upon the distillation system forming the subject matter of Letters Patent No. 1,443,742 granted to me January 30, 1923.

In the aforesaid patent I have disclosed a gravity system for effecting fractional distillation employing a plurality of vapor boxes or stills so disposed as to effect a gravity flow of the material in process from the highest to the lowest, and utilizing the heat of the final residuum by means of heat interchangers connected in alternating relation between the vapor boxes or stills and utilizing the heat of the vapors or distillates by transferring the heat to the crude material as it enters the same.

The chief object of the present improvement is to provide a system wherein there shall be a more efficient and more perfectly controlled exchange of heat between the outflowing vapors and residuum and the inflowing crude material, resulting in a greater conservation of the original source of heat, which is preferably superheated steam. In the process disclosed in my former patent above-identified, the crude material flowing through the several stills is heated wholly from an original source of heat, namely, superheated steam flowing counter-current to, and out of contact with, the crude material passing through the stills.

According to my present invention the crude material flowing through the stills is heated and the distillates are liberated therefrom by heat supplied in part by the final residuum, in part by the vapors or distillates from succeeding stills, and in part by the original source of superheated steam. The latent heat of vaporization of the vapors is very large in amount, while the temperature heat of the residuum is very high; and by utilizing and transferring both of these forms of heat to the material in process, a large economy in the heat required to maintain the system in operation is effected; and by the employment of suitable apparatus, as hereinafter described, very perfect regulation and control are obtainable.

With these desirable objects in view, I have evolved the method and apparatus for effecting continuous fractional distillation forming the subject matter of the present invention; and I will now proceed to give a detailed description of the same in connection with the accompanying drawings wherein I have illustrated two slightly different forms of apparatus in which the mechanical features of the invention may be embodied, and by the use of which my novel method or process of distillation may be carried out.

I may here remark that the present invention has been so designed as to preferably, although not exclusively make use of superheated steam, as the primary heating agent in the vapor boxes or stills of the system; and in the apparatus herein disclosed I have illustrated a heating equipment adapted to the use of superheated steam, but it should be understood that in the broader aspects of the invention the use of superheated steam is optional and not essential.

Referring to the drawings:—

Fig. 1 is a diagrammatic view of a complete distillation plant embodying my invention;

Fig. 2 is a longitudinal section through one of the coolers;

Fig. 3 is an enlarged vertical section through one of the vapor boxes or stills;

Fig. 4 is an enlarged cross-section through one of the vapor boxes or stills on the line 4—4 of Fig. 3;

Figs. 5, 6 and 7 are enlarged fragmentary views showing three detail structures of the heating plate used in the vapor boxes or stills;

Fig. 8 is a detail view in vertical section of a leveling device that may be used in connection with the coolers;

Fig. 9 is an enlarged horizontal section on the line 9—9 of Fig. 8;

Fig. 10 is a detail view in vertical section of a trap that is interposed between successive vapor boxes for permitting the upward passage of the vapor and the return to the cooler of the portion of the vapor condensed in the upper vapor box;

Fig. 11 is a view similar to Fig. 1, showing a modification in the routing of the vapors.

Referring first to Fig. 1, A, A', A² and A³ represent a series of vapor boxes or stills disposed at successively lower levels in which the material treated is subjected to heat for the purpose of driving off the distillates which are released at different temperatures. B designates a leveling tank located above the topmost vapor box and connected into the upper end of the latter by a pipe 5. C, C', C², C³ represent a series of combined coolers and heat exchangers that are connected with the several vapor boxes by the means hereinafter described. D represents a residuum tank located beneath the lowermost vapor box A³ and connected with the latter by a pipe 6; and E designates a residuum pump connected with the tank D by a pipe 7 and with the lowermost vapor box A³ by a pipe 8 equipped with a cut-off valve 9. The lower ends of the vapor boxes A, A' and A² are connected with the upper ends of the vapor boxes A', A² and A³ by bent pipes F, F' and F² each of which includes a trap 10.

For a full understanding of the connections of the vapor boxes to each other and to the coolers, a detailed description of the vapor boxes and coolers, which are structurally all alike, will next be given.

Referring to Figs. 3 and 4, which show one of the vapor boxes in vertical and horizontal section, respectively, this box comprises an outer rectangular box-like housing or casing consisting of stationary top and bottom walls 11 and 12, stationary opposed side walls 13, and laterally removable opposed side walls 14 which are normally united to the side walls 13 by angle bars 15 and bolts 16 (Fig. 4). Within this casing or housing is a zigzag circuitous conduit for the flow of the material in process in the form of a thin film through the vapor box. This conduit is made up of hollow substantially flat inclined plates or walls 17 and 18 that are connected at their proximate ends by curved walls 17' and 18' respectively, of the same hollow formation. Each complete series of plates 17 and 18 with its curved connecting plates is of zigzag or W-form, the two series being internested, and the zigzag conduit for the flow of the material in process being between them. It it to be noted as constituting a novel structural feature of these heating plates that they are so formed as to provide two parallel independent passage ways or conduits for the flow of heating material. The outer conduit 19 of each series (relatively to the zigzag conduit for the material in process formed by and between the two series) is designed for the inflow of superheated steam. The inner conduit 20 of the right hand series, viewing Figs. 1 and 3, is for the flow of vapor or distillate from a succeeding vapor box or boxes, and the inner conduit 21 of the left hand series is for the flow of residuum. These conduit walls or heating plates are shown diagrammatically in Fig. 3, but in Figs. 5, 6 and 7 I have illustrated several practical structural forms which they may embody. For instance, they may consist of steel plates 22, 23 and 24 united at intervals by spaced rivets 25, as shown in Fig. 5; or of cellular castings 26, as illustrated in Fig. 6. As shown in Fig. 7 they are formed by a group of parallel tubes 28, covered and spaced by corrugated metal plates 29 united between the tubes by rivets 30; the tubes 28 carrying one of the heating agents, and the ducts formed between the tubes and the plates carrying the other. Still other structural forms of hollow heating plates each providing two or more independent conduits for a heating medium, may be employed within the purview of the invention.

The lower and upper walls 18 extend through one of the side walls 14, forming vapor tight joints with the latter, and the lower and upper walls 17 likewise extend through the opposite side wall 14.

The two groups of W-shaped heating plates 17 and 18 within the housing are supported on vertical frame structures 31 and 32, respectively, at each side, the two pairs of frames being connected by tie-rods 33 on which the inclined walls 17 and 18 rest, as clearly shown in Fig. 3. On the lower ends of the frames 31 and 32 are wheels 34 traveling on a pair of rails 35 forming a trackway. At one upper corner of the housing is an overflow trough 36, into which trough the material in process is introduced through the pipe 5 leading from the leveling tank or from one of the delivery pipes F, F', F², and from which trough it overflows onto the broad inclined topmost heating plate 17 of the conduit, dropping from the end of the latter onto the topmost wall 18, flowing in a broad wide film-like stream down and off the lower end of the latter onto the next wall 17, and so on to the bottom of the vapor box; being discharged from the bottom wall 12 of the latter through the pipe F, F' or F² into the next vapor box of the series, or, in the case of the lowermost vapor box, through the pipe 6 directly into the residuum tank D.

Fig. 2 illustrates a practical form of cooler and heat exchanger unit, same consisting of a drum 37 having hollow heads 38 and 39 connected by tubes 40. 41 and 42 designate a pair of baffle plates extending in opposite directions from the inner walls of the hollow heads 39 and 38 respectively, nearly but not quite to the opposite end, thereby producing a zigzag route or passage-way for the condensates and for the vapors while undergoing condensation. From the bottoms of the traps 10, residuum from any of the vapor boxes may be drawn off through a valved branch $10^a$ to obtain residuums of a lighter constituency than the residuum from vapor box $A^3$.

The crude material enters the system through pipe 42, passing through the topmost cooler C which is also a condenser, thence through pipe 43 to and through cooler C', thence through pipe 44 to and through cooler $C^2$, thence through pipe 45 to and through cooler $C^3$, thence through pipe 46, and manifold 47, and pipe 48 into the leveling tank B controlled by float valve indicated at 49 which maintains a constant level in said tank. The crude material thus passes through the several coolers consecutively according to ascending temperatures. Pipe 44 has a cut-off valve 50 and a valve controlled branch 51 leading into the manifold 47. By manipulation of these valves, the coolers $C^2$ and $C^3$ can be cut out, if desired, and the material routed directly from the cooler C' to the leveling tank. Under a constant gravity pressure in the leveling tank B, due to constant liquid level, the crude material flows through pipe 5 into and through the first vapor box A, thence through connecting pipe F into and through the second vapor box A', thence through connecting pipe F' into and through the third vapor box $A^2$, and thence through connecting pipe $F^2$ into and through the fourth vapor box $A^3$, the residuum from the latter flowing through pipe 6 into residuum tank D.

By reason of the described structure of vapor box, the material in process, from the time it enters the first vapor box until it leaves the last, is, in its passage through the vapor boxes, spread out in a thin film progressively coming in contact with hotter heating plates, successively being atomized by dropping from plate to plate, and continually liberating vapors as the vaporizing temperatures of the fractional distillates are reached in its downward course.

The vapor given off in the lowermost vapor box $A^3$ flows upwardly through a pipe 52 into the vapor conduit 20 of the right hand series of heating plates of the vapor box $A^2$, imparting a portion of its heat to the material flowing in the opposite direction through said vapor box; a small uncondensed portion of said vapor passing thence by a pipe 53 over into the cooler $C^3$, and the condensate flowing off from the latter through a branch pipe 54 and main delivery pipe 55. 56 is a drain pipe connecting the cooler $C^3$ with the vapor pipe 52 through a trap 57, which trap is shown in detail in Fig. 10 wherein it will be seen that the pipe 52 has, at the bottom of the trap, a partition 58 in which is set a vapor tube 59 which allows the vapor to pass upwardly as described and also allows the major portion of said vapor which condenses while flowing through the heating plates of the vapor box $A^2$ to drain back through trap 57 and pipe 56 to the cooler $C^3$; the trap 57 being equipped with a drain valve or bleeder 60.

A similar pipe $52^a$ connects the top of vapor box $A^2$ with the right hand heating plates of vapor box A', and a similar drain pipe $56^a$ and trap $57^a$ serve to pass condensed vapor to the cooler $C^2$. The same system is repeated between vapor boxes A' and A, consisting of vapor pipe $52^b$, and drain pipe $56^b$ and trap $57^b$. The vapor outlet from vapor box A' is connected with cooler $C^2$ by pipe $53^a$ and the vapor outlet from vapor box A is connected to cooler C' by pipe $53^b$. The vapor liberated in the top vapor box A flows directly to the condenser C through pipe $52^c$.

The coolers $C^2$, C' and C are equipped with condensate drain pipes $54^a$ and $55^a$, $54^b$ and $55^b$ and $54^c$ and $55^c$, respectively. For maintaining a predetermined or desired level in each of the coolers, the drain pipes thereof are each equipped with a leveling device, such as is shown in detail in Figs. 8 and 9, wherein the vertical drain pipe, such as 55, is provided with a partition 61, in which is slidably mounted a tube 62 having an open upper end, as shown in Fig. 9, carrying a spider 63, in the hub of which is mounted the lower end of a screw threaded rod 64, this latter extending upwardly through and in threaded engagement with a head or cap 65 on the upper end of the pipe 55 and equipped with a hand wheel 66 for turning the same. By raising and lowering the overflow tube 62, the upper open end of the latter establishes the level of the liquid in the cooler, in an obvious manner.

The manifold 47, hereinbefore referred to has a valved branch 67 by opening which and closing a cut off valve 68 in the pipe 45, the crude material may be passed successively through the coolers C, C' and $C^2$, cutting out the last cooler $C^3$.

A pipe 69 is connected into one leg of the trap of the pipe F between vapor boxes A and A' and is equipped near the junction with a valve 70. Pipe 69 terminates in a manifold 71 having three valved branches 72, 73 and 74 that communicate with the pipes 44, 45 and 46, respectively. A pipe 75 also communicates with the same leg of the trap of pipe F, beneath the pipe 69, and has a valve 76 near the junction and terminates at its other end in a manifold 77 having three valved branches 78, 79 and 80 communicating with the pipes 44, 45 and 46, respectively. In the leg of the trap of pipe F with which pipes 69 and 75 communicate, and between the junctions of said pipes is a valve 81.

From the pipes 69 and 75 branch pipes 69' and 75' lead into the adjacent leg of the trap of pipe F' which connects vapor boxes A' and A², said branch pipes having valves 70' and 76', and the trap having a valve 81' located between the junctions of the branch pipes 69' and 75'. By closing the valves 81 and 81', opening the valves 70, 70' and 76, 76' and suitably manipulating the valves in the manifolds 71 and 77, the crude material flowing from vapor box A to vapor box A' or from vapor box A' to vapor box A² may be routed through the coolers C² and C³ which will preferably be done whenever the temperatures in either or both of said coolers is too high, thereby making the transferable heat in these coolers more flexible.

By means of the pump E, the residuum from the tank D is forced upwardly through the pipe 8 into the inner duct 21 of the left hand series of heating plates of the lowermost vapor box A³, giving up a portion of its heat to the material flowing countercurrent through said vapor box. Similar pipes 8ª, 8ᵇ and 8ᶜ serve to transfer the residuum in ascending progression between the remaining vapor boxes of the series, the residuum deprived of most of its heat flowing off to a final receptacle through the pipe 8ᵈ.

The primary source of heat is, as above indicated, preferably super-heated steam which enters the system by way of a pipe 82 that extends upwardly alongside the several vapor boxes. The outer ducts of both the right and left hand series of heating plates are designed to convey the superheated steam, and these steam ducts are connected between adjacent vapor boxes on the left side by pipes 83, 83ª and 83ᵇ, and on the right side by pipes 84, 84ª and 84ᵇ. A second steam supply pipe 85 leads off from the pipe 82 and extends upwardly along the right hand side of the vapor boxes. A valved pipe 86 leads from the pipe 82 into the left steam duct of the lower vapor box A³, and a valved pipe 87 connects the pipe 85 with the right hand steam duct of the same vapor box. Valved branches 86ª, 86ᵇ and 86ᶜ connect the steam line 82 with the several steam connecting pipes 83, 83ª and 83ᵇ, respectively, and valved branches 87ª, 87ᵇ and 87ᶜ connect the line 85 with the steam connecting pipes 84, 84ª and 84ᵇ, respectively. The main lines 82 and 85 above the lower vapor box, and their several branches are in the nature of boost lines which may be called into action whenever it is desired to bring the temperature of the vapor in an upper box more nearly to that existing in a lower box.

The boosting of the steam temperature is accomplished by connecting the two final exhaust steam lines 88 and 89, which merge into a single line at 90, with a suitable exhauster, and connecting the left and right hand series of steam connecting pipes between the vapor boxes with such exhaust pipes by valved branch pipes 91, 91ª and 91ᵇ, and 92, 92ª and 92ᵇ, respectively, drawing off steam of lower temperature to be replaced by steam of higher temperature from the booster lines.

Fig. 11 illustrates a different routing of the uncondensed portions of the vapors flowing through the heaters of the vapor boxes A², A' and A. Instead of delivering these vapors through pipes 53, 53ª and 53ᵇ directly to the coolers C³, C² and C', as in the arrangement shown in Fig. 1, I deliver them through pipes 153, 153ª and 153ᵇ into the pipes 52ª, 52ᵇ and 52ᶜ respectively where they mingle with the vapors liberated in vapor boxes A², A' and A; so that all uncondensed vapors from the lower boxes travel upwardly through successively higher vapor boxes, the parts thereof that condense en route flowing over to the coolers, while the residue passes over into the top condenser C. This arrangement possesses two principal advantages. In the first place, all crude petroleum contains certain non-condensable gases, such as ammonia, hydrogen sulphide, hydrocarbon compounds, etc., and this arrangement passes all such gases into the condenser C, instead of scattering them through all the coolers. In the second place, and what is of more importance, by this arrangement any portion of the vapor liberated from the lowest box A³ that does not condense in its passage through the heater of box A² is sent up into the heater of box A' and mingles in the latter with the vapor liberated in box A², belonging to approximately the same boiling range as the latter. The same is true with reference to the vapors liberated from boxes A² and A' that do not condense in passing through the heaters of boxes A' and A. They mingle with vapors liberated from boxes A' and A and become part of the fractions distilled in boxes A' and A. This arrangement thus effects a somewhat more perfect fractionation in that the entire content of each fraction is more nearly even and uniform in character and boiling point.

It may here be noted that the vapor boxes or stills herein shown and described also fulfil the functions of heat exchangers and to a considerable extent of condensers, since most of the vapors are condensed to liquid form before reaching the coolers C', C² and C³, which gives to these coolers the nature and character of heat exchangers by reason of the fact that in them the latent heat of vaporization of vapors condensed in both the vapor boxes and coolers is transferred to the inflowing crude material. Petroleum distillation systems at present in vogue are for the most part extremely wasteful of heat, actually utilizing only about 20% of the heat applied. By reason of the carefully graded and controlled exchange of heat in both the vapor boxes and the coolers of my present system, these figures are practically reversed,—about 80% of the heat being utilized and only about 20% going to waste.

I claim:

1. In a method of effecting continuous distillation, the steps or operations which consist in causing the crude material to flow by gravity through a series of vapor boxes, passing a heating agent through said vapor boxes out of contact with the crude material and in counter-direction to the flow of the latter, simultaneously passing the vapor given off by one of said vapor boxes through a higher vapor box out of contact with the crude material flowing through the latter, and simultaneously passing the residuum from the lowermost vapor box upwardly through a higher vapor box out of contact with the crude material flowing through the latter.

2. In a method of effecting continuous distillation, the steps or operations which consist in causing the crude material to flow by gravity in a circuitous path through a series of vapor boxes, passing a heating agent through said vapor boxes out of contact with the crude material and in counter direction to the flow of the latter, simultaneously passing the vapor liberated in a lower vapor box of the series through the next higher vapor box out of contact with, and in parallel counter-flow to, the crude material flowing through the latter, and then passing the uncondensed part of the said vapor, together with the vapor generated in said next higher vapor box, through a still higher vapor box of the series out of contact with, and in parallel counter-flow to, the crude material flowing through the latter.

3. In an apparatus for effecting continuous distillation, the combination of a series of vapor boxes arranged to effect a gravity flow of the crude material therethrough, means for passing a heating agent through said vapor boxes out of contact with the crude material, means for passing the heated vapor liberated in a lower box of the series to and through an upper box out of contact with the crude material, and means for passing the residuum from the last box of the series successively through the remaining boxes out of contact with the crude material.

4. In a hydrocarbon distillation system, the combination of an upper vapor box containing a hollow heating element, a lower vapor box, a pipe for conducting the material in process from said upper to said lower vapor box, a pipe for delivering vapor generated in said lower vapor box to the heating element of said upper vapor box, a cooler, a pipe connecting said last-named pipe to said cooler for the flow of condensates from the heating element of said upper vapor box to said cooler, and a trap at the junction of said last-named pipes to prevent flow of the vapor from the heating element of said upper vapor box to said cooler.

5. In an apparatus for effecting continuous distillation, the combination of a series of vapor boxes for effecting the gravity flow of the material to be distilled successively therethrough, hollow heating elements in said vapor boxes, a pipe for conducting vapor generated in each lower box to the heating element of an upper box, a series of coolers, condensate drain pipes leading from the heating elements of certain of said vapor boxes to certain of said coolers, means for passing the crude material through said coolers and thence to the highest vapor box, and means for by-passing the crude material at will around a cooler.

6. In an apparatus for effecting continuous distillation, the combination of a group of vapor boxes connected in series to effect the gravity flow of the material to be distilled successively therethrough, hollow heating elements in said vapor boxes, a pipe for conducting vapor generated in each lower box to the heating element of an upper box, a series of coolers, condensate drain pipes leading from the heating elements of certain of said vapor boxes to certain of said coolers, and means for interposing one of said coolers into the path of flow of the material between successive vapor boxes.

7. In an apparatus for effecting continuous distillation, the combination of a group of vapor boxes connected in series to effect gravity flow of the material to be distilled successively therethrough, hollow heating elements disposed upright in said vapor boxes, a pipe for conducting the vapor generated in a lower vapor box to the lower end of the heating element in the next higher box, and a pipe connecting the upper end of the heating element in said next higher box into the lower end of the heating element of a still higher box of the group.

8. In an apparatus for effecting continuous distillation, the combination of a group of vapor boxes connected in series to effect gravity flow of the material to be distilled successively therethrough, hollow heating elements disposed upright in said vapor boxes, a pipe for conducting the vapor generated in a lower vapor box to the lower end of the heating element in the next higher box, a pipe connecting the upper end of the heating element in said next higher box into the lower end of the heating element of a still higher box of the group, a series of coolers, and condensate drain pipes leading from the lower ends of said heating elements to said coolers.

9. In an apparatus for effecting continuous distillation, the combination of upper, intermediate and lower vapor boxes connected in series to effect gravity flow of the material to be distilled successively therethrough, hollow heating elements disposed upright in said boxes, pipes for conducting vapors generated in said lower and intermediate boxes into the lower ends of the heating elements of said intermediate and upper boxes, respectively, and a pipe for conducting uncondensed vapor in the heating element of said intermediate box into the presence of, and commingling it with, the vapor generated in and flowing from said intermediate vapor box.

10. In an apparatus for effecting continuous distillation, the combination of a group of vapor boxes connected in series to effect the gravity flow of the material to be distilled successively therethrough hollow heating elements in said vapor boxes, a steam line connected into the heating element of the lowest vapor box, steam conducting pipes connecting the heating elements of adjacent vapor boxes, a booster steam line having valved branches connected into said steam conducting pipes, and an exhaust steam line having valved branches connected into said steam conducting pipes.

FRANCIS M. HESS.